United States Patent
Saptharishi et al.

(10) Patent No.: US 11,967,306 B2
(45) Date of Patent: Apr. 23, 2024

(54) CONTEXTUAL SPEECH RECOGNITION METHODS AND SYSTEMS

(71) Applicant: HONEYWELL INTERNATIONAL INC., Charlotte, NC (US)

(72) Inventors: Hariharan Saptharishi, Madurai (IN); Gobinathan Baladhandapani, Madurai (IN); Sivakumar Kanagarajan, Bangalore (IN); Amal Leo, Madurai (IN)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 290 days.

(21) Appl. No.: 17/354,580

(22) Filed: Jun. 22, 2021

(65) Prior Publication Data
US 2022/0335926 A1    Oct. 20, 2022

(30) Foreign Application Priority Data
Apr. 14, 2021   (IN) ............... 202111017392

(51) Int. Cl.
*G10L 15/00*   (2013.01)
*G10L 15/02*   (2006.01)
*G10L 15/22*   (2006.01)
*G10L 15/30*   (2013.01)

(52) U.S. Cl.
CPC .............. *G10L 15/02* (2013.01); *G10L 15/22* (2013.01); *G10L 15/30* (2013.01); *G10L 2015/223* (2013.01)

(58) Field of Classification Search
CPC ......... G10L 15/07; G10L 15/20; G10L 15/22; G10L 15/26; G10L 15/30; G10L 15/02; G10L 15/063; G10L 15/08; G10L 13/00; G10L 15/165; G10L 25/30; G10L 21/0208; G10L 25/78; G10L 25/87; G10L 15/1822; G10L 15/183; G06F 3/016
See application file for complete search history.

(56) References Cited

U.S. PATENT DOCUMENTS

| | | |
|---|---|---|
| 7,668,719 B2 | 2/2010 | Nakagawa et al. |
| 8,768,698 B2 | 7/2014 | Mengibar et al. |
| 8,793,139 B1 | 7/2014 | Serban et al. |
| 8,812,316 B1 | 8/2014 | Chen |
| 9,047,870 B2 | 6/2015 | Ballinger et al. |
| 9,487,167 B2 | 11/2016 | Graumann et al. |

(Continued)

FOREIGN PATENT DOCUMENTS

| | | |
|---|---|---|
| CN | 111785257 A | 10/2020 |
| EP | 0618565 A2 | 1/1994 |
| EP | 0613110 A1 | 2/1994 |

*Primary Examiner* — Vu B Hang
(74) *Attorney, Agent, or Firm* — Lorenz & Kopf LLP

(57) ABSTRACT

Methods and systems are provided for assisting operation of a vehicle using speech recognition. One method involves automatically identifying an input element based at least in part on an audio communication with respect to the vehicle, identifying one or more constraints associated with the input element, obtaining a limited command vocabulary for the input element using the one or more constraints, and automatically constructing a contextual speech recognition graph for the input element prior to user selection of the input element using the limited command vocabulary. Thereafter, subsequently received audio input is recognized using the contextual speech recognition graph that was automatically and prospectively generated.

20 Claims, 4 Drawing Sheets

(56) References Cited

U.S. PATENT DOCUMENTS

| | | |
|---|---|---|
| 9,881,608 B2 | 1/2018 | LeBeau et al. |
| 2005/0144187 A1 | 6/2005 | Che et al. |
| 2011/0137653 A1 | 6/2011 | Ljolje et al. |
| 2019/0147858 A1 | 5/2019 | Letsu-Dake et al. |

CONTEXTUAL SPEECH RECOGNITION METHODS AND SYSTEMS

CROSS REFERENCE TO RELATED APPLICATION

The present application claims benefit of prior filed Indian Provisional Patent Application No. 202111017392, filed Apr. 14, 2021, which is hereby incorporated by reference herein in its entirety.

TECHNICAL FIELD

The subject matter described herein relates generally to vehicle systems, and more particularly, embodiments of the subject matter relate to contextual speech recognition for interfacing with aircraft systems and related cockpit displays using air traffic control communications.

BACKGROUND

Air traffic control typically involves voice communications between air traffic control and a pilot or crewmember onboard the various aircrafts within a controlled airspace. For example, an air traffic controller (ATC) may communicate an instruction or a request for pilot action by a particular aircraft using a call sign assigned to that aircraft, with a pilot or crewmember onboard that aircraft acknowledging the request (e.g., by reading back the received information) in a separate communication that also includes the call sign. As a result, the ATC can determine that the correct aircraft has acknowledged the request, that the request was correctly understood, what the pilot intends to do, etc.

Modern flight deck displays (or cockpit displays) are utilized to provide a number of different displays from which the user can obtain information or perform functions related to, for example, navigation, flight planning, guidance and navigation, and performance management. Modern displays also allow a pilot to input information, such as, navigational clearances or commands issued by ATC. However, input of an incomplete and/or incorrect clearance can be consequential and antithetical to maintaining aircraft control. Accordingly, it is desirable to provide aircraft systems and methods that facilitate inputting ATC clearances or commands with improved accuracy. Other desirable features and characteristics of the methods and systems will become apparent from the subsequent detailed description and the appended claims, taken in conjunction with the accompanying drawings and the preceding background.

BRIEF SUMMARY

Methods and systems are provided for assisting operation of a vehicle, such as an aircraft. One method involves automatically identifying an input element based at least in part on an audio communication with respect to the vehicle, identifying one or more constraints associated with the input element, obtaining a command vocabulary for the input element, automatically constructing a contextual speech recognition graph for the input element prior to user selection of the input element, wherein the contextual speech recognition graph comprises a subset of the command vocabulary using the one or more constraints, and recognizing an audio input as an input state with respect to the input element using the contextual speech recognition graph.

In another embodiment, a computer-readable medium having computer-executable instructions stored thereon is provided. The computer-executable instructions, when executed by a processing system, cause the processing system to automatically predict an input element for selection by a user based at least in part on an audio communication, identify one or more constraints associated with the input element, obtain a limited command vocabulary for the input element using the one or more constraints, automatically construct a contextual speech recognition graph for the input element corresponding to the limited command vocabulary, and thereafter recognize an audio input as an input state with respect to the input element using the contextual speech recognition graph in response to selection of the input element.

In another embodiment, a system is provided that includes a display device having a graphical user interface display rendered thereon, a communications system to receive one or more audio communications, an audio input device receive input voice command audio, and a processing system coupled to the display device, the communications system and the audio input device to automatically identify an input element on the graphical user interface display based at least in part on the one or more audio communications, identify one or more constraints associated with the input element, identify a limited command vocabulary for the input element using the one or more constraints, automatically construct a contextual speech recognition graph for the input element prior to user selection of the input element using the limited command vocabulary, and thereafter recognize the input voice command audio as an input state with respect to the input element using the contextual speech recognition graph.

This summary is provided to describe select concepts in a simplified form that are further described in the detailed description. This summary is not intended to identify key or essential features of the claimed subject matter, nor is it intended to be used as an aid in determining the scope of the claimed subject matter.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
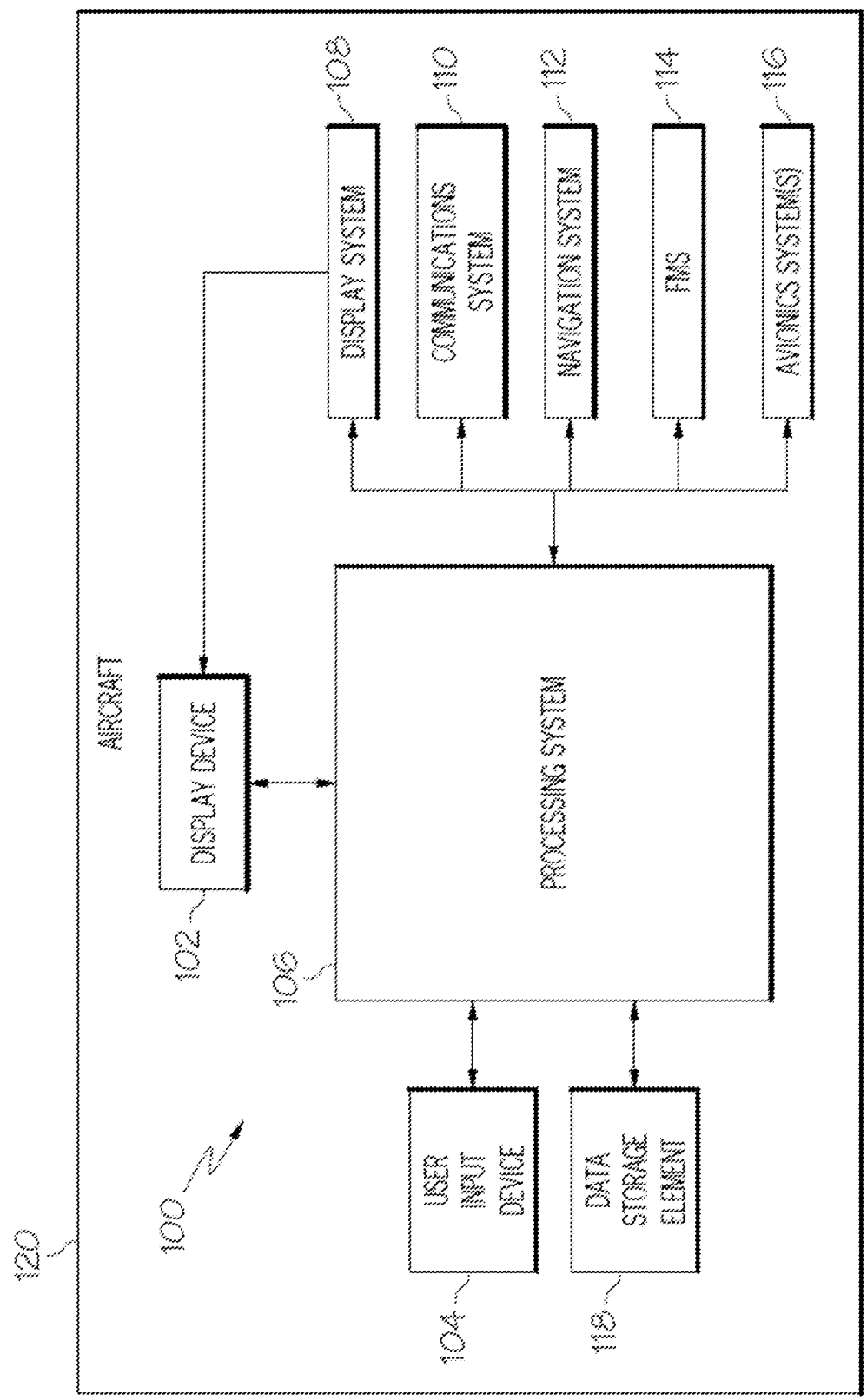
FIG. 1 is a block diagram illustrating a system suitable for use with a vehicle such as an aircraft in accordance with one or more exemplary embodiments.

The following detailed description is merely exemplary in nature and is not intended to limit the subject matter of the application and uses thereof. Furthermore, there is no intention to be bound by any theory presented in the preceding background, brief summary, or the following detailed description.

Embodiments of the subject matter described herein generally relate to systems and methods that facilitate a vehicle operator providing an audio input to one or more displays or onboard systems using a contextual speech recognition graph that is influenced by clearance communications associated with different vehicles operating within a commonly controlled area. For purposes of explanation, the subject matter is primarily described herein in the context of aircraft operating in a controlled airspace; however, the subject matter described herein is not necessarily limited to aircraft or avionic environments, and in alternative embodiments, may be implemented in an equivalent manner for ground operations, marine operations, or otherwise in the context of other types of vehicles and travel spaces.

As described in greater detail below, audio communications received at the aircraft are parsed and analyzed to automatically identify potential input elements that are likely to be selected by the pilot or other aircraft operator. In this regard, based on the ATC clearances that pertain to the aircraft and the different GUI displays currently presented on the display devices or cockpit display systems onboard the aircraft, one or more potential GUI input element(s) on current GUI display(s) that are likely to be selected by the pilot are predicted based on the contents of the ATC clearance for the aircraft using natural language processing to map the ATC clearance to particular parameters, settings and/or the like. For a predicted GUI input element, any constraints associated with the parameter or setting that is configurable using that GUI input element are identified (e.g., a minimum value, a maximum value, the units associated with the input value, and/or the like) are identified and utilized to filter a generic or universal command vocabulary (e.g., by excluding invalid values, units, and/or the like) to obtain filtered command vocabulary that is tailored for the predicted GUI input element.

Using the filtered command vocabulary, a contextual speech recognition graph for the predicted GUI input element is automatically constructed prior to the pilot selecting the predicted GUI input element for data entry. In this regard, the contextual speech recognition graph is constructed using the command vocabulary subset that includes only the potential alphanumerical values and units that are allowed or otherwise associated with the predicted GUI input element. In exemplary embodiments, the contextual speech recognition graph is realized as a directed graph data structure that reflects the potential input phraseology and sequencing of terms, alphanumerical values and units for providing a speech input for the GUI input element, thereby improving the accuracy and response time of speech recognition. By using the ATC clearance communications to contextually predict, forecast or otherwise anticipate the GUI input element(s) likely to be selected in advance of the pilot selecting the GUI input element(s), the contextual speech recognition graph(s) for the respective GUI input element(s) can be automatically constructed prior to receiving an audio input or selection of a GUI input element. Thus, in response to selection of a predicted GUI input element and receiving audio input with respect to the selected GUI input element, the contextual speech recognition graph may be utilized to quickly and accurately recognize the received audio input as a particular input state with respect to the input element without delays that would otherwise be associated with constructing a graph data structure after selection of a GUI input element.

For example, in one or more implementations, a speech recognition engine is implemented using two components, an acoustic model and a language model, where the language model is implemented as a finite state graph configurable to function as or otherwise support a finite state transducer, where the acoustic scores from the acoustic model are utilized to compute probabilities for the different paths of the finite state graph, with the highest probability path being recognized as the desired user input which is output by the speech recognition engine to an onboard system. In this regard, by dynamically limiting the search space for the language model to the predetermined contextual speech recognition graph, the probabilistic pass through the predetermined contextual speech recognition graph is more likely to produce an accurate result with less time required (e.g., by virtue of limiting the search space and anticipatorily constructing the contextual speech recognition graph data structure for a GUI input element prior to pilot selection or entry).

FIG. 1 depicts an exemplary embodiment of a system 100 which may be utilized with a vehicle, such as an aircraft 120. In an exemplary embodiment, the system 100 includes, without limitation, a display device 102, one or more user input devices 104, a processing system 106, a display system 108, a communications system 110, a navigation system 112, a flight management system (FMS) 114, one or more avionics systems 116, and a data storage element 118 suitably configured to support operation of the system 100, as described in greater detail below.

In exemplary embodiments, the display device 102 is realized as an electronic display capable of graphically displaying flight information or other data associated with operation of the aircraft 120 under control of the display system 108 and/or processing system 106. In this regard, the display device 102 is coupled to the display system 108 and the processing system 106, and the processing system 106 and the display system 108 are cooperatively configured to display, render, or otherwise convey one or more graphical representations or images associated with operation of the aircraft 120 on the display device 102. The user input device 104 is coupled to the processing system 106, and the user input device 104 and the processing system 106 are cooperatively configured to allow a user (e.g., a pilot, co-pilot, or crew member) to interact with the display device 102 and/or other elements of the system 100, as described in greater detail below. Depending on the embodiment, the user input device(s) 104 may be realized as a keypad, touchpad, keyboard, mouse, touch panel (or touchscreen), joystick, knob, line select key or another suitable device adapted to receive input from a user. In some exemplary embodiments, the user input device 104 includes or is realized as an audio input device, such as a microphone, audio transducer, audio sensor, or the like, that is adapted to allow a user to provide audio input to the system 100 in a "hands free" manner using speech recognition.

The processing system 106 generally represents the hardware, software, and/or firmware components configured to facilitate communications and/or interaction between the elements of the system 100 and perform additional tasks and/or functions to support operation of the system 100, as described in greater detail below. Depending on the embodiment, the processing system 106 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 106 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 106 includes processing logic that may be configured to carry out the functions, techniques, and processing tasks associated with the operation of the system 100, as described in greater detail below. Furthermore, the steps of a method or algorithm described in connection with the embodiments disclosed herein may be embodied directly in hardware, in firmware, in a software module executed by the processing system 106, or in any practical combination thereof. For example, in one or more embodiments, the processing system 106 includes or otherwise accesses a data storage element (or memory), which may be realized as any sort of non-transitory short or long term storage media capable of storing programming instructions for execution by the processing system 106. The code or other computer-executable programming instructions, when read and executed by the processing system 106, cause the processing system 106 to support or otherwise perform certain tasks, operations, functions, and/or processes described herein.

The display system 108 generally represents the hardware, software, and/or firmware components configured to control the display and/or rendering of one or more navigational maps and/or other displays pertaining to operation of the aircraft 120 and/or onboard systems 110, 112, 114, 116 on the display device 102. In this regard, the display system 108 may access or include one or more databases suitably configured to support operations of the display system 108, such as, for example, a terrain database, an obstacle database, a navigational database, a geopolitical database, a terminal airspace database, a special use airspace database, or other information for rendering and/or displaying navigational maps and/or other content on the display device 102.

In the illustrated embodiment, the aircraft system 100 includes a data storage element 118, which contains aircraft procedure information (or instrument procedure information) for a plurality of airports and maintains association between the aircraft procedure information and the corresponding airports. Depending on the embodiment, the data storage element 118 may be physically realized using RAM memory, ROM memory, flash memory, registers, a hard disk, or another suitable data storage medium known in the art or any suitable combination thereof. As used herein, aircraft procedure information should be understood as a set of operating parameters, constraints, or instructions associated with a particular aircraft action (e.g., approach, departure, arrival, climbing, and the like) that may be undertaken by the aircraft 120 at or in the vicinity of a particular airport. An airport should be understood as referring to any sort of location suitable for landing (or arrival) and/or takeoff (or departure) of an aircraft, such as, for example, airports, runways, landing strips, and other suitable landing and/or departure locations, and an aircraft action should be understood as referring to an approach (or landing), an arrival, a departure (or takeoff), an ascent, taxiing, or another aircraft action having associated aircraft procedure information. An airport may have one or more predefined aircraft procedures associated therewith, wherein the aircraft procedure information for each aircraft procedure at each respective airport are maintained by the data storage element 118 in association with one another.

Depending on the embodiment, the aircraft procedure information may be provided by or otherwise obtained from a governmental or regulatory organization, such as, for example, the Federal Aviation Administration in the United States. In an exemplary embodiment, the aircraft procedure information comprises instrument procedure information, such as instrument approach procedures, standard terminal arrival routes, instrument departure procedures, standard instrument departure routes, obstacle departure procedures, or the like, traditionally displayed on a published charts, such as Instrument Approach Procedure (IAP) charts, Standard Terminal Arrival (STAR) charts or Terminal Arrival Area (TAA) charts, Standard Instrument Departure (SID) routes, Departure Procedures (DP), terminal procedures, approach plates, and the like. In exemplary embodiments, the data storage element 118 maintains associations between prescribed operating parameters, constraints, and the like and respective navigational reference points (e.g., waypoints, positional fixes, radio ground stations (VORs, VOR-TACs, TACANs, and the like), distance measuring equipment, non-directional beacons, or the like) defining the aircraft procedure, such as, for example, altitude minima or maxima, minimum and/or maximum speed constraints, RTA constraints, and the like. In this regard, although the subject matter may be described in the context of a particular procedure for purpose of explanation, the subject matter is not intended to be limited to use with any particular type of aircraft procedure and may be implemented for other aircraft procedures in an equivalent manner.

Still referring to FIG. 1, in exemplary embodiments, the processing system 106 is coupled to the navigation system 112, which is configured to provide real-time navigational data and/or information regarding operation of the aircraft 120. The navigation system 112 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 112, as will be appreciated in the art. The navigation system 112 is capable of obtaining and/or determining the instantaneous position of the aircraft 120, that is, the current (or instantaneous) location of the aircraft 120 (e.g., the current latitude and longitude) and the current (or instantaneous) altitude or above ground level for the aircraft 120. The navigation system 112 is also capable of obtaining or otherwise determining the heading of the aircraft 120 (i.e., the direction the aircraft is traveling in relative to some reference). In the illustrated embodiment, the processing system 106 is also coupled to the communications system 110, which is configured to support communications to and/or from the aircraft 120. For example, the communications system 110 may support communications between the aircraft 120 and air traffic control or another suitable command center or ground location. In this regard, the communications system 110 may be realized using a radio communication system and/or another suitable data link system.

In exemplary embodiments, the processing system 106 is also coupled to the FMS 114, which is coupled to the navigation system 112, the communications system 110, and one or more additional avionics systems 116 to support navigation, flight planning, and other aircraft control functions in a conventional manner, as well as to provide real-time data and/or information regarding the operational status of the aircraft 120 to the processing system 106. Although FIG. 1 depicts a single avionics system 116, in practice, the system 100 and/or aircraft 120 will likely include numerous avionics systems for obtaining and/or providing real-time flight-related information that may be displayed on the display device 102 or otherwise provided to a user (e.g., a pilot, a co-pilot, or crew member). For example, practical embodiments of the system 100 and/or aircraft 120 will likely include one or more of the following avionics systems suitably configured to support operation of the aircraft 120: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

It should be understood that FIG. 1 is a simplified representation of the system 100 for purposes of explanation and ease of description, and FIG. 1 is not intended to limit the application or scope of the subject matter described herein in any way. It should be appreciated that although FIG. 1 shows the display device 102, the user input device 104, and the processing system 106 as being located onboard the aircraft 120 (e.g., in the cockpit), in practice, one or more of the display device 102, the user input device 104, and/or the processing system 106 may be located outside the aircraft 120 (e.g., on the ground as part of an air traffic control center or another command center) and communicatively coupled to the remaining elements of the system 100 (e.g., via a data link and/or communications system 110). Similarly, in some embodiments, the data storage element 118 may be located outside the aircraft 120 and communicatively coupled to the processing system 106 via a data link and/or communications system 110. Furthermore, practical embodiments of the system 100 and/or aircraft 120 will include numerous other devices and components for providing additional functions and features, as will be appreciated in the art. In this regard, it will be appreciated that although FIG. 1 shows a single display device 102, in practice, additional display devices may be present onboard the aircraft 120. Additionally, it should be noted that in other embodiments, features and/or functionality of processing system 106 described herein can be implemented by or otherwise integrated with the features and/or functionality provided by the FMS 114. In other words, some embodiments may integrate the processing system 106 with the FMS 114. In yet other embodiments, various aspects of the subject matter described herein may be implemented by or at an electronic flight bag (EFB) or similar electronic device that is communicatively coupled to the processing system 106 and/or the FMS 114.

Figure 2:
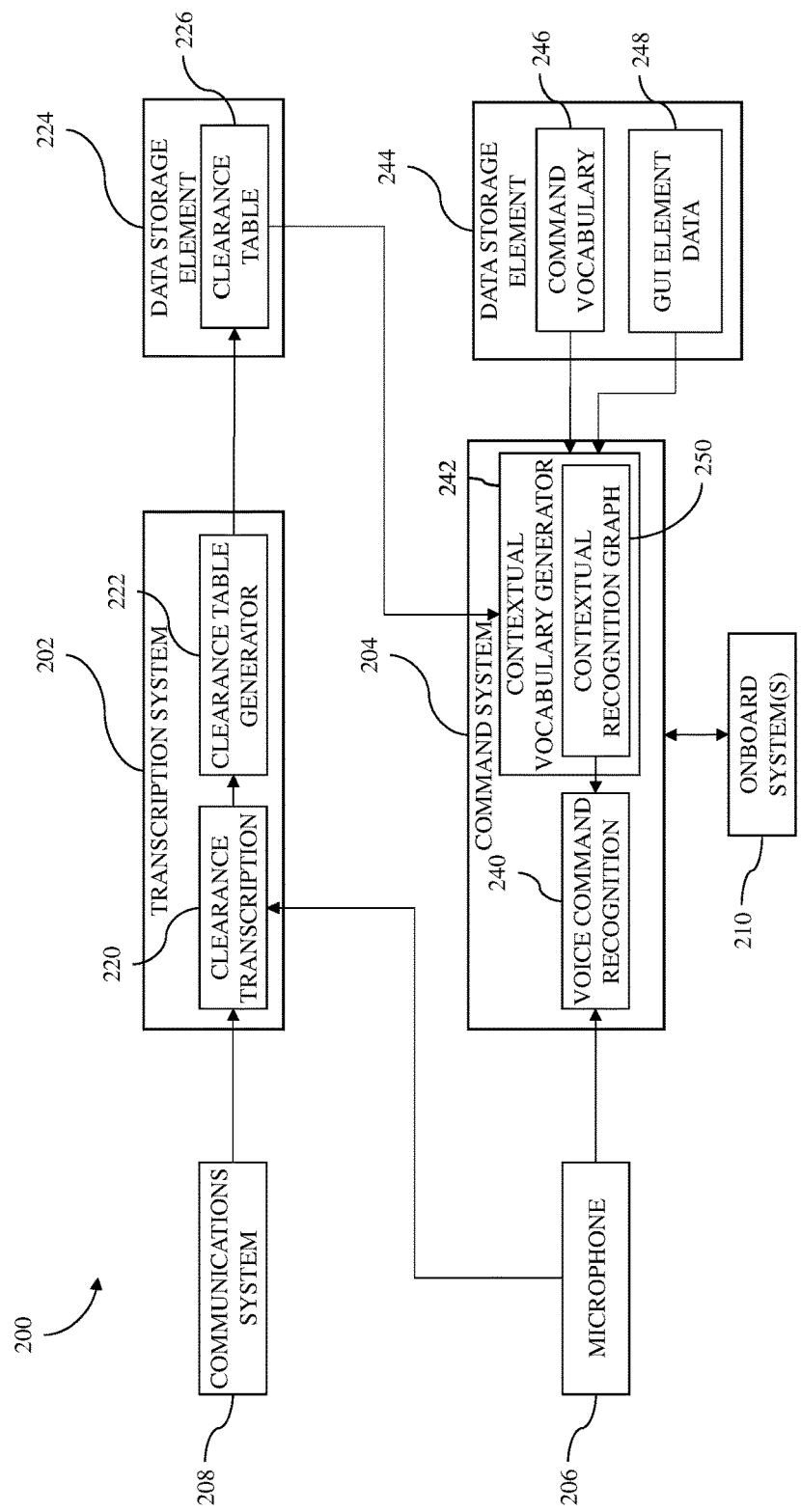
FIG. 2 is a block diagram illustrating a contextual speech recognition system suitable for use with the aircraft system of FIG. 1 in accordance with one or more exemplary embodiments.

FIG. 2 depicts an exemplary embodiment of a contextual speech recognition system 200 for recognizing speech or voice commands using a contextually-predictive recognition vocabulary and finite state directed graph data structure. In one or more exemplary embodiments, the contextual speech recognition system 200 is implemented or otherwise provided onboard a vehicle, such as aircraft 120; however, in alternative embodiments, the contextual speech recognition system 200 may be implemented independent of any aircraft or vehicle, for example, at a ground location such as an air traffic control facility. That said, for purposes of explanation, the contextual speech recognition system 200 may be primarily described herein in the context of an implementation onboard an aircraft. The illustrated contextual speech recognition system 200 includes a transcription system 202, a command system 204, an audio input device 206 (or microphone) and one or more communications systems 208 (e.g., communications system 110). The output of the command system 204 is coupled to one or more onboard systems 210 (e.g., one or more avionics systems 108, 110, 112, 114, 116) to provide control signals or other indicia of a recognized control command or user input to the desired destination onboard system 210 (e.g., via an avionics bus or other communications medium) of the voice command for implementation or execution. It should be understood that FIG. 2 is a simplified representation of the contextual speech recognition system 200 for purposes of explanation and ease of description, and FIG. 2 is not intended to limit the application or scope of the subject matter described herein in any way.

The transcription system 202 generally represents the processing system or component of the contextual speech recognition system 200 that is coupled to the microphone 206 and communications system(s) 208 to receive or otherwise obtain clearance communications, analyze the audio content of the clearance communications, and transcribe the clearance communications, as described in greater detail below. The command system 204 generally represents the processing system or component of the contextual speech recognition system 200 that is coupled to the microphone 206 to receive or otherwise obtain voice commands, analyze the audio content of the voice commands, and output control signals to an appropriate onboard system 210 to effectuate the voice command, as described in greater detail below. In some embodiments, the transcription system 202 and the command system 204 are implemented separately using distinct hardware components, while in other embodiments, the features and/or functionality of the transcription system 202 and the command system 204 maybe integrated and implemented using a common processing system (e.g., processing system 106). In this regard, the transcription system 202 and the command system 204 may be implemented using any sort of hardware, firmware, circuitry and/or logic components or combination thereof. In one or more exemplary embodiments, the transcription system 202 and the command system 204 are implemented as parts of the processing system 106 onboard the aircraft 120 of FIG. 1.

The audio input device 206 generally represents any sort of microphone, audio transducer, audio sensor, or the like capable of receiving voice or speech input. In this regard, in one or more embodiments, the audio input device 206 is realized as a microphone (e.g., use input device 104) onboard the aircraft 120 to receive voice or speech annunciated by a pilot or other crewmember onboard the aircraft 120 inside the cockpit of the aircraft 120. The communications system(s) 208 (e.g., communications system 110) generally represent the avionics systems capable of receiving clearance communications from other external sources, such as, for example, other aircraft, an air traffic controller, or the like. Depending on the embodiment, the communications system(s) 208 could include one or more of a very high frequency (VHF) radio communications system, a controller-pilot data link communications (CPDLC) system, an aeronautical operational control (AOC) communications system, an aircraft communications addressing and reporting system (ACARS), and/or the like.

In exemplary embodiments, computer-executable programming instructions are executed by the processor, control module, or other hardware associated with the transcription system 202 and cause the transcription system 202 to generate, execute, or otherwise implement a clearance transcription application 220 capable of analyzing, parsing, or otherwise processing voice, speech, or other audio input received by the transcription system 202 to convert the received audio into a corresponding textual representation. In this regard, the clearance transcription application 220 may implement or otherwise support a speech recognition engine (or voice recognition engine) or other speech-to-text system. Accordingly, the transcription system 202 may also include various filters, analog-to-digital converters (ADCs), or the like, and the transcription system 202 may include or otherwise access a data storage element 224 (or memory) that stores a speech recognition vocabulary for use by the clearance transcription application 220 in converting audio inputs into transcribed textual representations. In one or more embodiments, the clearance transcription application 220 may also mark, tag, or otherwise associate a transcribed textual representation of a clearance communication with an identifier or other indicia of the source of the clearance communication (e.g., the onboard microphone 206, a radio communications system 208, or the like).

In exemplary embodiments, the computer-executable programming instructions executed by the transcription system 202 also cause the transcription system 202 to generate, execute, or otherwise implement a clearance table generation application 222 (or clearance table generator) that receives the transcribed textual clearance communications from the clearance transcription application 220 or receives clearance communications in textual form directly from a communications system 208 (e.g., a CPDLC system). The clearance table generator 222 parses or otherwise analyzes the textual representation of the received clearance communications and generates corresponding clearance communication entries in a table 226 in the memory 224. In this regard, the clearance table 226 maintains all of the clearance communications received by the transcription system 202 from either the onboard microphone 206 or an onboard communications system 208.

In exemplary embodiments, for each clearance communication received by the clearance table generator 222, the clearance table generator 222 parses or otherwise analyzes the textual content of the clearance communication using natural language processing and attempts to extract or otherwise identify, if present, one or more of an identifier contained within the clearance communication (e.g., a flight identifier, call sign, or the like), an operational subject of the clearance communication (e.g., a runway, a taxiway, a waypoint, a heading, an altitude, a flight level, or the like), an operational parameter value associated with the operational subject in the clearance communication (e.g., the runway identifier, taxiway identifier, waypoint identifier, heading angle, altitude value, or the like), and/or an action associated with the clearance communication (e.g., landing, takeoff, pushback, hold, or the like). The clearance table generator 222 also identifies the radio frequency or communications channel associated with the clearance communication and attempts to identify or otherwise determine the source of the clearance communication. The clearance table generator 222 then creates or otherwise generates an entry in the clearance table 226 that maintains an association between the textual content of the clearance communication and the identified fields associated with the clearance communication. Additionally, the clearance table generator 222 may analyze the new clearance communication entry relative to existing clearance communication entries in the clearance table 226 to identify or otherwise determine a conversational context to be assigned to the new clearance communication entry.

Still referring to FIG. 2, the processor, control module, or other hardware associated with the command system 204 executes computer-executable programming instructions that cause the command system 204 to generate, execute, or otherwise implement a voice command recognition application 240 capable of analyzing, parsing, or otherwise processing voice, speech, or other audio user input received by the command system 204 via the microphone 206 to convert the received audio into a corresponding command intended for a particular destination output system 210. In this regard, command recognition application 240 implements or otherwise supports a speech recognition engine (or voice recognition engine) or other speech-to-text system. In exemplary embodiments, the recognition engine implemented by the command recognition application 240 is realized using a two-stage probabilistic recognition scheme that includes an acoustic model and a language model realized as a finite state directed graph data structure, where the acoustic scores from the acoustic model are utilized to compute probabilities for the different paths (or sequences of nodes and edges) of the finite state graph data structure, with the highest probability path being recognized as the desired command input by the user, for which corresponding control signals are then output by the command recognition application 240 to the appropriate onboard system 210 for implementing or executing the recognized command.

In exemplary embodiments, the processor, control module, or other hardware associated with the command system 204 executes computer-executable programming instructions that cause the command system 204 to generate, execute, or otherwise implement a contextual vocabulary generation application 242 (or contextual vocabulary generator) that dynamically limits the search space for the language model for the command recognition application 240 to a contextual recognition graph data structure 250 that represents a subset of the universal command vocabulary 246 for the command recognition application 240 that is predicted for entry based on the operational context or other contextual information derived from the transcribed clearance table 226. In this regard, in exemplary embodiments, the contextual vocabulary generator 242 utilizes one or more of the conversational and temporal context information associated with different clearance communications pertaining to the ownship aircraft 120 and the current context or state of one or more onboard systems 210 to identify one or more user input elements likely to be selected by the pilot or other aircraft operator in connection with providing a voice command to the command system 204.

In one or more exemplary embodiments, the contextual vocabulary generator 242 analyzes the sequence of transcribed clearance communications associated with the aircraft in the clearance table 226 (e.g., using an identifier associated with the ownship aircraft) to ascertain the operational subject, the operational parameter value and/or the aircraft action associated with the most recent assignment received from the ATC and/or the most recent acknowledgment provided by the pilot. Thereafter, the contextual vocabulary generator 242 analyzes the currently state of the onboard display device(s) 102 to identify the potential input GUI elements or widgets contained within one or more of the currently displayed GUI display(s) on the display device(s) 102 that are associated with or otherwise correspond to at least one of the identified subject, the identified parameter and/or the identified aircraft action from the most recent ATC assignment or acknowledgment using data 248 associated with the displayed GUI elements. In this regard, the GUI element data 248 includes information characterizing the GUI elements or widgets depicted on particular GUI displays such as, for example, the name or identification of the parameter or variable associated with the GUI element, the units associated with the parameter or variable associated with the GUI element, and the valid or allowable range of values associated with the parameter or variable associated with the GUI element (e.g., minimum values, maximum values, and/or the like).

For each potential input GUI element that matches or otherwise corresponds to an identified portion of a clearance communication associated with the aircraft, contextual vocabulary generator 242 generates a contextual recognition graph data structure 250 associated with the respective potential input GUI element by filtering or otherwise excluding, from the universal command vocabulary 246, words, terms, alphanumerical values, units and the like that are not associated with or otherwise inconsistent with the GUI element data 248 before generating the contextual recognition graph data structure 250. In this regard, the contextual recognition graph data structure 250 associated with the respective potential input GUI element only includes the potential input phraseology and sequencing of terms, alphanumerical values and units associated with the respective GUI input element and excludes potential input phraseology and sequencing of terms, alphanumerical values and units associated with other displayed GUI input elements that are not pertinent to the ATC clearance communications. Additionally, in some embodiments, the vocabulary generator 242 may utilize the content of the ATC clearance communications to further limit the subset of the command vocabulary 246 used to generate the contextual recognition graph data structure 250, for example, by limiting the potential input phraseology and sequencing of terms to include only the operational subject(s), operational parameter value(s) and/or aircraft action(s) pertaining to the clearance communications for the ownship aircraft.

For example, the pilot of an aircraft using the identifier "Mooney 58102" may initiate communication with ATC on approach to an airport in Phoenix via a radio or other onboard communications system by annunciating the following audio communication (which may be transcribed by the transcription system 202 to the clearance table 226): "PHOENIX APPROACH MOONEY FIVE EIGHT ONE ZERO TWO IS WITH YOU TEN THOUSAND FOUR HUNDRED DESCENDING REQUESTING DESCENT THROUGH CLASS B." The ATC may respond with the following clearance (which may be also transcribed by the transcription system 202 to the clearance table 226): "MOONEY FIVE EIGHT ONE ZERO TWO PHOENIX APPROACH GOOD MORNING PHOENIX ALTIMETER IS TWO NINER EIGHT THREE VERIFY DESTINATION IS DEER VALLEY." Applying natural language processing to the sequence of clearance communications, the clearance table generator 222 and/or the contextual vocabulary generator 242 may identify the destination airport and the altimeter setting as the operational subjects of the clearance communications, Phoenix Deer Valley Airport and 2983 as the operational parameter values associated with the destination airport and altimeter setting, respectively. For example, natural language processing keyword spotting may be applied to determine the likelihood of appearances of certain words or phrases before performing syntactic and semantic analysis determine the associated key (e.g., regional or airfield pressure setting (QNH)) and value for the key (e.g., 2983).

After identifying the operational subject(s), parameter(s) and/or action(s) associated with the transcribed communication, the contextual vocabulary generator 242 identifies potential input GUI elements associated with the operational subjects that are likely to be selected by the pilot in connection with the sequence of clearance communications, and then obtains, for each potential input GUI element, the constraints or other criteria associated with the respective input GUI element using the data 248 associated with the respective input GUI element. For example, based on the GUI display(s) currently presented on the display device(s) 102, the contextual vocabulary generator 242 may identify a text box for the regional or airfield pressure setting (QNH) as the currently displayed input GUI element that is likely to be selected by the pilot. In this regard, in one or more embodiments, each GUI element is associated with a unique widget identification number that may be utilized to establish and maintain associations between particular words or phrases and the GUI element. For example, the data storage element 244 or another mapping database may be utilized to store, for each operational subject, operational parameter, aircraft action and/or other key words or phrases, the unique widget identification numbers for different GUI elements that relate to or are otherwise associated with that respective word, term or phrase. Thereafter, in response to identifying the ATC communication corresponding to the pressure setting (or QNH), the mapping database may be queried using the pressure setting (or QNH) as a keyword or search term to identify the unique widget identification numbers for different GUI elements that relate to or are otherwise associated with the pressure setting (or QNH). The unique widget identification numbers may then be utilized to maintain an association between a GUI element and a contextual recognition graph data structure 250. In this regard, in some embodiments, the command system 204 and/or the contextual vocabulary generator 242 may analyze the GUI displays currently presented on the onboard display device(s) 102 to identify a subset of one or more currently displayed GUI elements of the different potential GUI elements corresponding to the keyword(s) for which a corresponding contextual recognition graph data structure 250 should be generated.

To generate the contextual recognition graph 250 for the QNH text box, the contextual vocabulary generator 242 queries the GUI element data 248 and/or an onboard system associated with the GUI display including the QNH text box to identify or otherwise obtain constraints or criteria associated with the QNH text box, such as, for example, a minimum valid QNH setting value, a maximum valid QNH setting value, one or more valid format(s) for the QNH setting value, units associated with the QNH setting value and/or the like. Thereafter, using the constraints associated with the QNH text box, the contextual vocabulary generator 242 filters the universal command vocabulary 246 to obtain a limited subset of potential terms, alphanumerical values and/or units for the QNH text box that satisfy the constraints or criteria associated with the QNH text box. For example, the constraints associated with the QNH text box may limit the QNH setting value to a numerical value between 2200 and 3248 with a valid format that may include a decimal separator or point between the first two and last two digits of the setting value. The limited subset of the command vocabulary 246 that is specific to the QNH text box is then utilized to generate a contextual finite state directed graph data structure 250 that encompasses or spans the potential input phraseology, sequencing and/or combination of the terms, alphanumerical values and/or units that satisfy the valid format(s) for the QNH setting value. In this regard, the contextual finite state directed graph data structure 250 effectively incorporates any range checks, data formatting, or other validation criteria that would be applied to a textual input to the QNH text box.

For example, the initial level of the contextual finite state directed graph data structure 250 may be limited to nodes corresponding to the numerical values of 2, 3 and 22 thorough 32. The second level of the graph data structure 250 following the node for the numerical value of 2 may include nodes limited to the numerical values 2 through 9, while the second level of the graph data structure 250 following the node for numerical value of 3 may be limited to the numerical values 0 through 2, the second level of the graph data structure 250 following the node for numerical value of 22 may be limited to the numerical values 0 through 99 and include the word "point" for the decimal separator, the second level of the graph data structure 250 following the node for numerical value of 32 may be limited to the numerical values 0 through 48 and include the word "point" for the decimal separator, and so on. It should be noted that in some embodiments, the limited subset of the command vocabulary 246 may be further limited by the operational subjects, operational parameters, and/or aircraft actions derived from the clearance communications. For example, continuing the above example, the limited subset of the command vocabulary 246 for the QNH text box may include or otherwise correspond to only a subset of those potential QNH setting values that are valid or allowable for the Phoenix Deer Valley Airport (e.g., when the range of allowable altimeter setting values for the Phoenix Deer Valley Airport is a subset of the range of all potential allowable altimeter setting values independent of any particular airport).

The contextual vocabulary generator 242 stores or otherwise maintains the contextual recognition graph 250 for the QNH text box in association with the QNH text box (e.g., using an identifier associated with the QNH text box). Thereafter, in response to receiving a signal indicative of a user selection of the QNH text box for providing a voice command (e.g., from a user input device 104 or an onboard system 210) that includes the identifier associated with the QNH text box, the contextual vocabulary generator 242 provides the contextual recognition graph 250 for the QNH text box to the voice command recognition application 240 for resolving audio input from the microphone 206 to a particular input voice command. After recognizing the audio input, the command system 204 and/or the voice command recognition application 240 provides control signals or other indicia of the recognized command input to an appropriate onboard system 210 for implementation or execution. For example, in response to recognizing an audio input from the microphone 206 as the input value of 2983 for the QNH text box, the command system 204 and/or the voice command recognition application 240 commands, signals, or otherwise instructs the appropriate onboard system(s) 210 to set the QNH pressure setting to 2983 and update the graphical representation of the QNH text box on the GUI displays(s) onboard the display device(s) 102 to depict the QNH pressure setting value of 2983 within the text box.

Still referring to FIG. 2, it should be noted that there are numerous different ways the transcribed communications could be utilized to predictively and contextually derive contextual recognition graphs for different input GUI elements or widgets, and the subject matter described herein is not limited to any particular implementation. For example, continuing the above example, for an input GUI element with defined input phraseology or sequencing that includes a placeholder for an airport variable, the contextual vocabulary generator 242 may limit nodes corresponding to the destination airport placeholder within the contextual recognition graph data structure 250 to include only words or terms corresponding to the destination airport (or variants thereof) derived from the transcribed clearance communications (e.g., Deer Valley, KPHX, Phoenix, etc.) rather than the entire universal vocabulary of potential airport names or identifiers.

Figure 3:
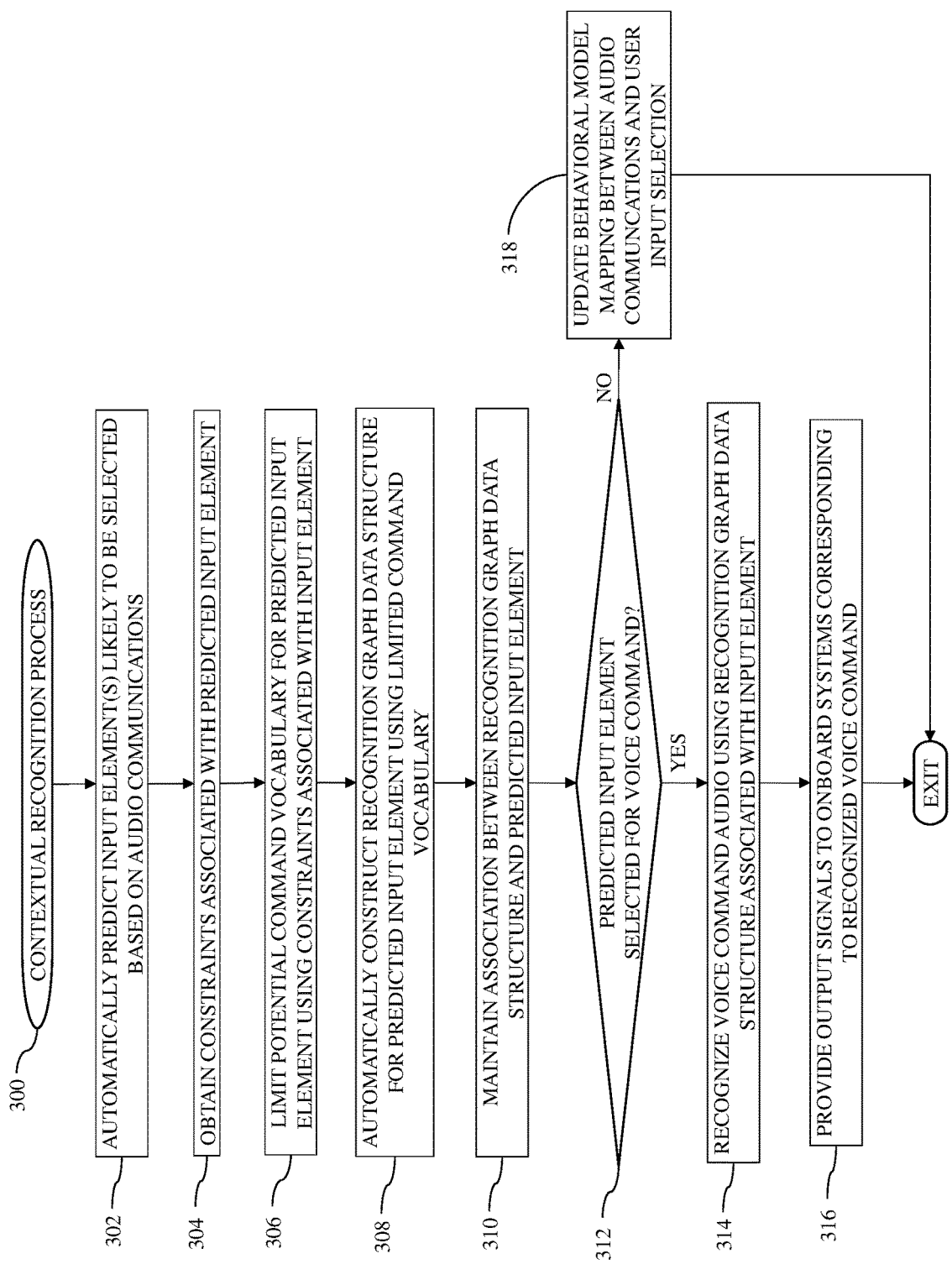
FIG. 3 is a flow diagram of a contextual recognition process suitable for implementation by the contextual speech recognition system of FIG. 2 in the aircraft system of FIG. 1 in one or more exemplary embodiments.

FIG. 3 depicts an exemplary embodiment of a contextual recognition process 300 suitable for implementation by an aircraft system to resolve or otherwise recognize a voice command or other received audio using a dynamically-generated, contextually-relevant recognition vocabulary that is specific to an individual input element. The various tasks performed in connection with the illustrated process may be implemented using hardware, firmware, software executed by processing circuitry, or any combination thereof. For illustrative purposes, the following description may refer to elements mentioned above in connection with FIGS. 1-2. In practice, portions of the contextual recognition process 300 may be performed by different elements of the aircraft system 100. That said, exemplary embodiments are described herein in the context of the contextual recognition process 300 being primarily performed by the processing system 106 implementing a contextual speech recognition system 200. It should be appreciated that the contextual recognition process 300 may include any number of additional or alternative tasks, the tasks need not be performed in the illustrated order and/or the tasks may be performed concurrently, and/or the tactile input resolution process may be incorporated into a more comprehensive procedure or process having additional functionality not described in detail herein. Moreover, one or more of the tasks shown and described in the context of FIG. 3 could be omitted from a practical embodiment of the tactile input resolution process as long as the intended overall functionality remains intact.

Referring to FIG. 3 with continued reference to FIGS. 1-2, in exemplary embodiments, the contextual recognition process 300 continually monitors and analyzes received audio communications and automatically predicts or otherwise identifies one or more input elements likely to be selected by a user based on the content of the received audio communications (task 302). As described above, in exemplary embodiments, the audio content of clearance communications received at the aircraft is continually transcribed into corresponding textual representations, which, in turn, are then parsed and analyzed to identify the potential GUI input elements or widgets that are likely to be relevant to the received sequence of clearance communications pertaining to the aircraft. For example, natural language processing may be applied to the textual representations of the clearance communications directed to the ownship aircraft by ATC or provided by the ownship aircraft to ATC to identify the operational subject(s) of the clearance communications and any operational parameter value(s) and/or aircraft action(s) associated with the clearance communications. Thereafter, the combination of operational subject(s), operational parameter(s) and/or aircraft action(s) associated with a sequence of clearance communications may be mapped to one or more GUI input elements based on definitional data associated with the GUI input elements and/or historical usage data associated with the GUI input elements.

For example, when a field label or other metadata associated with a GUI input element matches a type associated with the operational subject, that GUI input element may be identified as likely to be selected by the pilot. Thus, if the operational subject of the clearance communication is an airport and/or the content of the clearance communication includes an airport identifier, a currently displayed GUI input element corresponding to an airport for the flight plan (e.g., an airport name text box) may be identified as likely to be selected by a pilot for entering and/or modifying an airport selection. Additionally, or alternatively, machine learning, artificial intelligence or other similar analytical techniques may be applied to historical clearance communications data and pilot selection data to identify or otherwise determine what GUI input elements are likely to be selected based on preceding clearance communications sequences. In this regard, it should be appreciated there are any number of different potential techniques for mapping between clearance communications content and predicted GUI input elements, which may be used individually or in combination with one another, and the subject matter is not intended to be limited to any particular implementation.

After identifying an input element likely to be selected or activated by a user for inputting a voice command, the contextual recognition process 300 continues by identifying or otherwise obtaining one or more constraints to be applied to input received via the input element and then utilizing the constraints on input received via the input element to limit the potential vocabulary for recognizing audio of a voice command received in connection with the input element (tasks 304, 306). In this regard, a GUI input element or widget may be associated with one or more criteria or rules that are utilized to validate, characterize, or otherwise qualify input received via the GUI input element or widget, such as, for example, a minimum value, a maximum value, a range of acceptable input values, one or more valid format(s) for the input values, units to be associated with the input values, and/or the like. Based on the constraints associated with the predicted GUI input element identified based on the preceding clearance communications, the contextual vocabulary generator 242 filters or otherwise excludes terms, words, units and/or alphanumeric values from the potential command vocabulary 246 to obtain a limited subset of the command vocabulary 246 that includes only terms, words, units and/or alphanumeric values that satisfy or are otherwise consistent with the various criteria or rules that apply to that GUI input element. Thus, potentially extraneous elements of the command vocabulary 246 that would violate a constraint associated with the predicted GUI input element or are inconsistent with a valid entry to the predicted GUI input element are excluded from the potential search space (or recognition space) when performing speech recognition with respect to the predicted GUI input element.

After limiting the potential command vocabulary for the GUI input element predicted for selection based on the preceding audio communications, the contextual recognition process 300 continues by automatically constructing or otherwise generating a recognition graph data structure using the limited command vocabulary and storing or otherwise maintaining the recognition graph data structure in association with the predicted GUI input element (tasks 308, 310). For example, based on the contents of the limited command vocabulary, the contextual vocabulary generator 242 constructs a directed finite state graph data structure 250 that encompasses the set of potential combinations, sequencing and/or phrasing of elements of the limited command vocabulary for the predicted GUI input element. Depending on the embodiment, the graph data structure 250 can be realized as a unigram graph, a bigram graph, a trigram graph, or any other suitable combination of text features (e.g., n-gram), where the nodes of the graph data structure 250 correspond to allowable or possible input values or command terms for the respective GUI input element. The contextual vocabulary generator 242 utilizes an identifier associated with the predicted GUI input element (e.g., a unique widget identifier) to maintain an association between the predicted GUI input element and the recognition graph data structure 250 generated for the predicted GUI input element.

After constructing recognition graph data structures for each GUI input element predicted for potential user selection based on the preceding clearance communications, the contextual recognition process 300 detects or otherwise identifies when a contextually-predicted GUI input element is selected or otherwise activated in connection with a user providing a voice command (task 312). In this regard, the contextual recognition process 300 may monitor the user input device(s) 104, display device(s) 102 and/or other onboard systems 210 to detect or otherwise identify when a pilot or other aircraft operator manipulates a user interface or otherwise indicates a desire to select the predicted GUI input element on a display device 102 onboard the aircraft 120 for provisioning a voice command. In the absence of selection of a predicted GUI input element, the tasks 302, 304, 306, 308, 310 and 312 may continually repeat to dynamically update the predicted GUI input elements and corresponding recognition graph data structures to reflect newer or more recent clearance communications. For example, a recognition graph data structure 250 may be maintained for a departure airfield pressure setting (or departure QNH) GUI input element during a departure flight phase, before being deleted or discarded upon the aircraft transitioning to a subsequent flight phase during which the departure airfield pressure setting is no longer likely to be relevant.

When a predicted GUI input element is selected, the contextual recognition process 300 recognizes the received voice command audio using the predetermined recognition graph data structure associated with the predicted GUI input element and provides output signals corresponding to the recognized command to the appropriate onboard system(s) (tasks 314, 316). For example, when a pilot manipulates the user input device 104 to select a text box on a GUI display presented by a display system 108 on a display device 102, the display system 108 (e.g., onboard system 210) may provide a unique identifier associated with the text box to the command system 204 for use when recognizing the subsequently received voice command audio. When the selected text box was previously predicted for receiving an entry based on preceding ATC clearance communications (e.g., at task 302), the command system 204 uses the identifier associated with the text box to retrieve the recognition graph data structure 250 that was previously constructed for the text box to resolve or otherwise recognize the voice command audio subsequently received via the microphone 206 to a particular path of the recognition graph data structure 250. Once the voice command audio is probabilistically mapped or recognized to a particular path of the recognition graph data structure 250 having the highest probability of matching the voice command audio (e.g., using speech-to-text recognition), the voice command recognition application 240 maps the path of the data structure 250 to a corresponding command for one or more destination onboard system(s) 210 and provides output control signals for effectuating the input command to the destination onboard system(s) 210.

Figure 4:
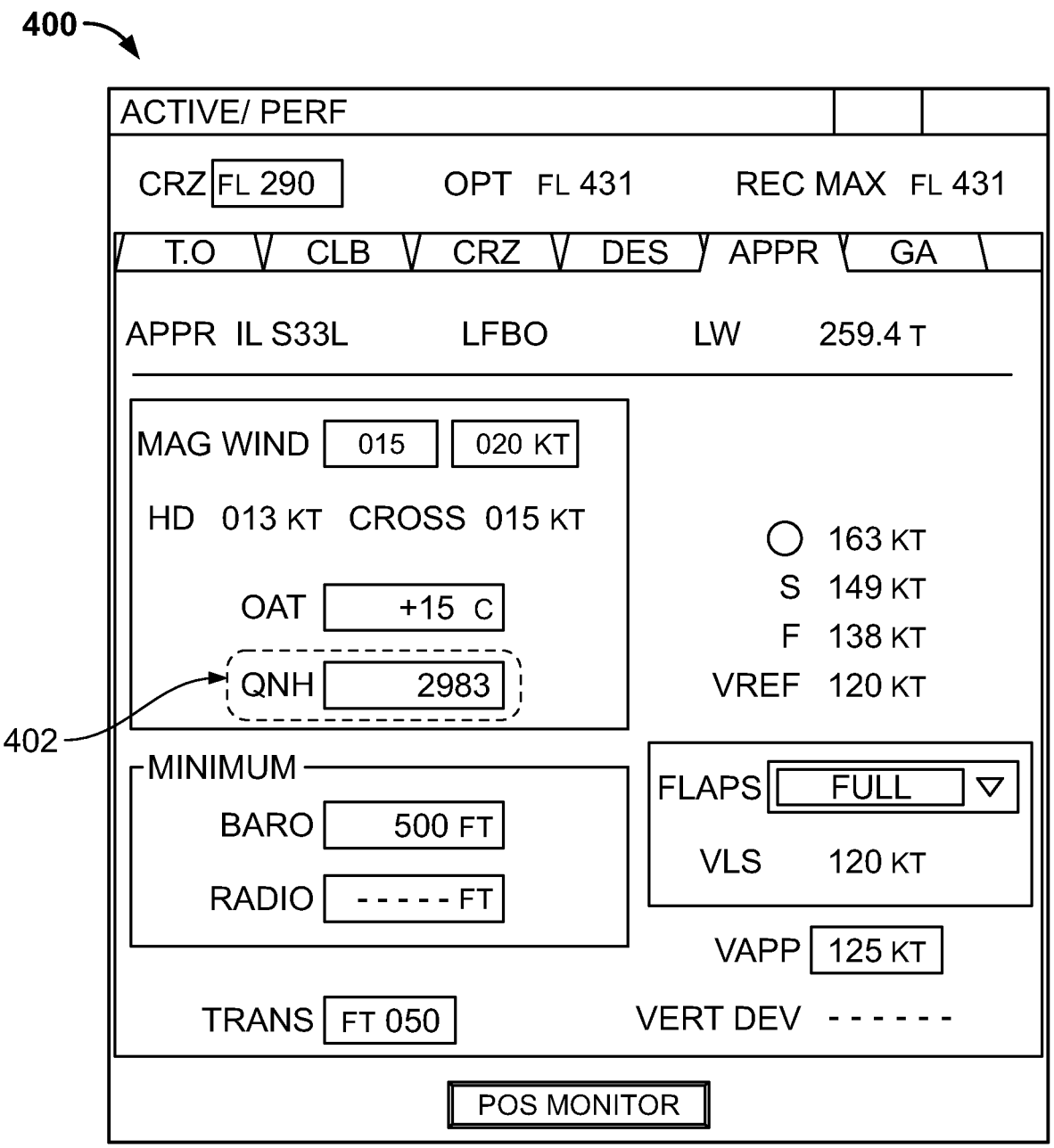
FIG. 4 is an exemplary graphical user interface (GUI) displays suitable for presentation on a display device onboard the aircraft in the system of FIG. 1 in connection with the contextual recognition process of FIG. 3 in accordance with one or more embodiments.

For example, referring to FIG. 4 with continued reference to FIGS. 1-3 and continuing the example described above in the context of FIG. 2, given the aircraft performance GUI display 400 currently presented on the display device 102 and the preceding ATC clearance communications with operational subjects pertaining to the altimeter setting at the destination airport, the contextual recognition process 300 may identify the QNH text box 402 as the currently displayed input GUI element predicted for selection by the pilot (e.g., task 302). Based on the minimum valid QNH setting value, the maximum valid QNH setting value, the QNH setting format, the QNH units and/or other constraints associated with the QNH text box 402, the contextual vocabulary generator 242 filters the command vocabulary 246 to obtain a limited subset of the command vocabulary for the QNH text box 402 (e.g., tasks 304, 306) and then generates a contextual finite state directed graph data structure 250 to be associated with the QNH text box 402 that encompasses or spans the potential combinations, sequencing and/or phrasing of elements of the limited command vocabulary for the QNH text box 402 (e.g., tasks 308, 310). When the pilot selects the QNH text box 402 for inputting a voice command, the command system 204 uses the identifier associated with the QNH text box 402 to retrieve the predetermined QNH text box recognition graph data structure 250 to resolve or otherwise recognize subsequently received audio to a particular commanded value or state for the QNH text box 402 (e.g., tasks 312, 314). Thereafter, the command system 204 outputs command signals to the display system 108 to update the graphical representation of the QNH setting value rendered or depicted within the QNH text box 402 to reflect the newly commanded value and also provides command signals to the navigation system 112, the FMS 114 and/or other onboard avionics systems 116, 210 to update the regional or airfield pressure setting value being implemented or utilized as a reference by those destination systems 112, 114, 116, 210 to reflect the newly commanded value. In this regard, by virtue of anticipatorily limiting the universal command vocabulary and the corresponding search space for the QNH setting recognition graph data structure 250 based on the current context of the ATC clearance communications, the voice command audio may be more quickly and accurately recognized and implemented at the appropriate onboard systems 108, 112, 114, 116, 210.

Referring again to FIG. 3 with continued reference to FIGS. 1-2, in one or more embodiments, in response to receiving a user input selection for a voice command input that is different from the predicted GUI input element(s), the contextual recognition process 300 utilizes the selected GUI input element to dynamically update the behavioral model utilized to map between audio communications context and likely user input selections (task 318). In this regard, when the command system 204 receives an identifier for a selected GUI input element that does not have a predetermined contextual recognition graph data structure 250 associated therewith, the voice command recognition application 240 utilizes a generic recognition graph data structure that is constructed using the full universal potential command vocabulary 246. Thereafter, the identifier for the selected GUI input element may be stored or otherwise maintained in association with the current ATC clearance communications context (e.g., the operational subject(s), the operational parameter(s) and/or aircraft action(s)) that preceded selection of the GUI input element. In this regard, in some embodiments, a data storage element 244 associated with the speech recognition system 200 may maintain behavioral modeling data that includes GUI input selection data in association with corresponding ATC clearance communications data. The behavioral modeling data may be periodically analyzed using machine learning or other artificial intelligence techniques to establish correlations and mappings between particular ATC clearance communications contexts and corresponding GUI input selections, which, in turn, may be utilized to predict GUI input elements for selection in the future (e.g., task 302). In this manner, new associations between ATC clearance communications contexts and GUI input elements may be established and utilized to predict GUI input elements likely to be selected when a particular ATC clearance communications context or sequence recurs. Thus, in some embodiments, the contextual recognition process 300 may predict the GUI input element(s) for selection in a manner that is specific to a particular pilot, airline, aircraft type, and/or the like depending on the content of the behavioral modeling data (e.g., when the behavioral modeling data is specific to a particular pilot, airline, aircraft make and/or model, etc.).

To briefly summarize, by utilizing multiple speech engines (e.g., clearance transcription and command recognition) and leveraging the current context of the ATC clearance communications to prospectively anticipate pilot selection and voice command behavior, limited recognition graph data structures specific to the predicted input element selections can be proactively constructed before the pilot selects an input element to provide a voice command. As a result, the limited recognition graph data structure for a predicted input element is available upon selection of the input element, thereby eliminating any delays which might otherwise be associated with constructing an element-specific vocabulary or data structure. Using the limited recognition graph data structure also simultaneously reduces response time and improves accuracy associated with probabilistically recognizing received audio input relative to a generic or universal vocabulary or data structure, thereby improving the user experience and usability.

For the sake of brevity, conventional techniques related to graphical user interfaces, graphics and image processing, speech recognition, touch sensing, touchscreens, avionics systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of assisting operation of a vehicle, the method comprising:
   automatically identifying an input element based at least in part on an audio communication with respect to the vehicle;
   identifying one or more constraints associated with the input element;
   obtaining a command vocabulary for the input element;
   automatically constructing a contextual speech recognition graph for the input element prior to user selection of the input element, wherein the contextual speech recognition graph comprises a subset of the command vocabulary using the one or more constraints; and
   recognizing an audio input as an input state with respect to the input element using the contextual speech recognition graph.

2. The method of claim 1, wherein:
   obtaining the command vocabulary comprises filtering a universal command vocabulary to obtain a filtered subset of the universal command vocabulary that is consistent with the one or more constraints; and
   the subset of the command vocabulary comprises the filtered subset of the universal command vocabulary.

3. The method of claim 2, wherein filtering the universal command vocabulary comprises excluding one or more terms, words or alphanumeric values that are inconsistent with the one or more constraints.

4. The method of claim 2, wherein automatically constructing the contextual speech recognition graph comprises automatically constructing a finite state graph data structure encompassing potential combinations of elements of the filtered subset of the universal command vocabulary.

5. The method of claim 1, wherein automatically identifying the input element comprises predicting the input element likely to be selected based at least in part on content of the audio communication.

6. The method of claim 5, further comprising identifying at least one of an operational subject, an operational parameter and an action for the vehicle based at least in part on the content of the audio communication, wherein predicting the input element comprises predicting the input element based on the at least one of the operational subject, the operational parameter and the action for the vehicle.

7. The method of claim 6, wherein:
   obtaining the command vocabulary comprises filtering a universal command vocabulary using the one or more constraints and the at least one of the operational subject, the operational parameter and the action for the vehicle to obtain a filtered subset of the universal command vocabulary; and
   the subset of the command vocabulary comprises the filtered subset of the universal command vocabulary.

8. The method of claim 1, further comprising providing control signals indicative of the input state to a system onboard the vehicle.

9. The method of claim 1, wherein recognizing the audio input comprises:
   identifying a highest probability path through the contextual speech recognition graph for the audio input; and
   mapping the highest probability path to the input state.

10. A non-transitory computer-readable medium having computer-executable instructions stored thereon that, when executed by a processing system, cause the processing system to:
    automatically predict an input element for selection by a user based at least in part on an audio communication;
    identify one or more constraints associated with the input element;
    obtain a limited command vocabulary for the input element using the one or more constraints;
    automatically construct a contextual speech recognition graph for the input element corresponding to the limited command vocabulary; and
    thereafter recognize an audio input as an input state with respect to the input element using the contextual speech recognition graph in response to selection of the input element.

11. The non-transitory computer-readable medium of claim 10, wherein the computer-executable instructions cause the processing system to filter a universal command vocabulary using the one or more constraints to obtain the limited command vocabulary for the input element.

12. The non-transitory computer-readable medium of claim 10, wherein the limited command vocabulary excludes one or more terms, words or alphanumeric values that are inconsistent with the one or more constraints.

13. The non-transitory computer-readable medium of claim 10, wherein the computer-executable instructions cause the processing system to automatically construct the contextual speech recognition graph as a finite state directed graph data structure corresponding to the limited command vocabulary.

14. The non-transitory computer-readable medium of claim 10, wherein the computer-executable instructions cause the processing system to:
- identify at least one of an operational subject, an operational parameter and an aircraft action based at least in part on content of the audio communication; and
- automatically predict the input element based on the at least one of the operational subject, the operational parameter and the aircraft action.

15. The non-transitory computer-readable medium of claim 10, wherein the computer-executable instructions cause the processing system to provide control signals indicative of the input state to an avionics system.

16. The non-transitory computer-readable medium of claim 10, wherein the computer-executable instructions cause the processing system to recognize the audio input by:
- identifying a highest probability path through the contextual speech recognition graph for the audio input; and
- mapping the highest probability path to the input state.

17. A system comprising:
- a display device having a graphical user interface display rendered thereon;
- a communications system to receive one or more audio communications;
- an audio input device receive input voice command audio; and
- a processing system coupled to the display device, the communications system and the audio input device to:
  - automatically identify an input element on the graphical user interface display based at least in part on the one or more audio communications;
  - identify one or more constraints associated with the input element;
  - identify a limited command vocabulary for the input element using the one or more constraints;
  - automatically construct a contextual speech recognition graph for the input element prior to user selection of the input element using the limited command vocabulary; and
  - thereafter recognize the input voice command audio as an input state with respect to the input element using the contextual speech recognition graph.

18. The system of claim 17, wherein the processing system is configured to update the input element on the graphical user interface display on the display device to reflect the input state in response to recognizing the input voice command audio as the input state.

19. The system of claim 17, wherein the processing system is configured to identify at least one of an operational subject, an operational parameter and an aircraft action based at least in part on content of the one or more audio communications and automatically predict the input element based on the at least one of the operational subject, the operational parameter and the aircraft action.

20. The system of claim 17, wherein the contextual speech recognition graph comprises a finite state directed graph data structure encompassing the limited command vocabulary.

\* \* \* \* \*